United States Patent
Clendenin

(10) Patent No.: US 7,155,455 B2
(45) Date of Patent: Dec. 26, 2006

(54) METHOD AND SYSTEM FOR BUSINESS INFORMATION NETWORKS

(75) Inventor: John A. Clendenin, St. Louis, MO (US)

(73) Assignee: Inner Circle Logistics, Inc., St. Louis, MO (US)

(*) Notice: Subject to any disclaimer, the term of this patent is extended or adjusted under 35 U.S.C. 154(b) by 75 days.

(21) Appl. No.: 10/325,925

(22) Filed: Dec. 23, 2002

(65) Prior Publication Data

US 2003/0126000 A1 Jul. 3, 2003

Related U.S. Application Data

(63) Continuation-in-part of application No. 09/533,863, filed on Mar. 24, 2000, now abandoned.

(51) Int. Cl.
*G06F 17/30* (2006.01)

(52) U.S. Cl. .................................. 707/104.1

(58) Field of Classification Search ..... 707/100–104.1, 707/1–10, 200–206; 714/100, 4; 705/1, 705/9, 10, 30, 28, 22, 8, 400; 370/466; 345/733; 709/223, 229; 340/573.3; 704/223
See application file for complete search history.

(56) References Cited

U.S. PATENT DOCUMENTS

| | | | | |
|---|---|---|---|---|
| 5,909,570 A | | 6/1999 | Webber | 703/13 |
| 5,974,395 A | * | 10/1999 | Bellini et al. | 705/9 |
| 6,125,391 A | * | 9/2000 | Meltzer et al. | 709/223 |
| 6,222,533 B1 | * | 4/2001 | Notani et al. | 345/733 |
| 6,263,322 B1 | * | 7/2001 | Kirkevold et al. | 705/400 |
| 6,289,384 B1 | * | 9/2001 | Whipple et al. | 709/229 |
| 6,308,178 B1 | * | 10/2001 | Chang et al. | 707/100 |
| 6,332,130 B1 | * | 12/2001 | Notani et al. | 705/28 |
| 6,664,897 B1 | * | 12/2003 | Pape et al. | 340/573.3 |
| 6,671,818 B1 | * | 12/2003 | Mikurak | 714/4 |
| 2002/0091536 A1 | * | 7/2002 | Seaman et al. | 705/1 |
| 2002/0138324 A1 | * | 9/2002 | Zarefoss et al. | 705/8 |
| 2003/0074250 A1 | * | 4/2003 | Burk | 705/10 |
| 2003/0083947 A1 | * | 5/2003 | Hoffman et al. | 705/22 |

FOREIGN PATENT DOCUMENTS

| | | |
|---|---|---|
| WO | WO 99/53391 | 10/1999 |
| WO | WO 01/91002 | 11/2001 |

OTHER PUBLICATIONS

Supplementary European Search Report for Application No. EP 03 81 4337, dated Dec. 29, 2005.

(Continued)

*Primary Examiner*—Diane Mizrahi
(74) *Attorney, Agent, or Firm*—George T. Marcou; Kilpatrick Stockton LLP

(57) ABSTRACT

Sharing business information. Establishing a plurality of user access profiles visible. Establishing small-to-medium enterprise (SME) client processes operative upon user direction, in accordance with the access profiles, to perform at least one of: access SME supply chain data, translate SME supply chain data from a native format to a common format, and transmit common format SME supply chain data via the at least one communications network. Establishing, for each SME client process, a SME host process, operative upon user direction, for the corresponding SME and in accordance with the access profiles, to perform at least one of: receive the common format supply chain data, and respond to queries of received common format supply chain data.

2 Claims, 3 Drawing Sheets

OTHER PUBLICATIONS

International Search Report for Application No. PCT/US03/41029, dated May 7, 2004 (mailing date).

International Preliminary Examination Report for Application No. PCT/US01/09423, dated May 28, 2002 (mailing date).

Buxmann, Peter, et al., "XML-Based Supply Chain Management-as *Simplex* as it is-," *Proceedings of the 35th Hawaii International Conference on System Sciences, IEEE Comput. Soc.*, pp. 2179-2188, Jan., 2002.

International Search Report for Application No. PCT/US01/09423, dated Jul. 13, 2001 (mailing date).

* cited by examiner

Figure 2. Business Information

METHOD AND SYSTEM FOR BUSINESS INFORMATION NETWORKS

CROSS REFERENCE TO RELATED APPLICATIONS

This application is a continuation-in-part of co-pending U.S. utility patent application Ser. No. 09/533,863, now abandoned entitled SUPPLY CHAIN INTEGRATION, filed Mar. 24, 2000; which application is hereby incorporated herein by reference in its entirety. This application claims priority to co-pending Patent Cooperation Treaty (PCT) patent application number PCT/US01/09423, entitled SUPPLY CHAIN INTEGRATION, filed Mar. 23, 2001; which application is hereby incorporated herein in its entirety.

FIELD OF THE INVENTION

The present invention relates generally to business information networks. More specifically, preferred embodiments of the present invention relate to the integration of small to medium enterprises (SMEs) into such networks.

BACKGROUND

The present invention relates generally to business information networks. More specifically, preferred embodiments of the present invention relate to the integration of small to medium enterprises (SMEs) into such networks. Many goods are manufactured using the supply chain model. A supply chain is a group of companies that individually manufacture, assemble, or distribute goods, parts or components that are incorporated into other items and then passed to the next company in the chain. As an example, automobile manufacturers use this model to describe manufacture of automobiles. The automobile is the ultimate consumer good. Automobile manufacturers are placed in the class of original equipment manufacturers (OEMs) as they supply the goods used by consumers.

In making an automobile, the OEM purchases parts from a plurality of suppliers. Referring to FIG. 1, the OEM 101 manufactures automobiles that are purchased and used by consumers 100. Some of the parts that go into making the car include brake pads, the engine, and tires, to name but a few. In order to make brake pads, brake pad manufacturers 110a and 110b purchase enhanced materials from synthetic materials supplier 120. In order to make an engine, engine manufacturer 111 purchases spark plugs and ball bearings from other manufacturers or suppliers 121 and 122. In order to make tires, the tire manufacturer 112 purchases rubber and steel belts from other suppliers/manufacturers 123 and 124.

Similarly, consulting firm 113 supplies consulting services to OEM 101. Examples of services include technical consulting, accounting and legal services. Those companies who supply goods and/or services directly to an OEM are called primary suppliers. Those companies that supply goods and/or services to the supply chain, but not directly to OEMs are called secondary suppliers. In the example shown in FIG. 1, primary suppliers are represented by 110–113 and the secondary suppliers are represented by 120–124. Secondary suppliers often sell to other secondary suppliers.

As can be seen from this example, the large companies, in this case OEM 101, rely on the SMEs 110–112 and 120–124 to manufacture important parts and components used in the ultimate goods. Thus, if a mistake or other problem occurs in production of tires from tire manufacturer 112 such that OEM 101 does not have enough tires to put on its automobiles, OEM's production of automobiles would likely cease until either the one supplier 112 resumes production or OEM 101 obtains tires from another supplier. Similar problems can occur in the other companies such as the ball bearings manufacture 121. If the ball bearing manufacturer 121 cannot increase production, perhaps due to a lack in steel production from steel producer 124, the engine manufacturer 111 will likely be unable to make more engines and OEM 101 cannot therefore make more automobiles.

There are ways that an OEM may compensate for an unexpected delay in production from one of its SMEs. One way is to stock up on certain products when the supply is good. Thus, when a tire manufacturer 112 is producing at full output, an automobile manufacturer 101 will purchase more than it needs and inventory the excess. When a tire manufacturer 112 slows production for whatever reason, an automobile manufacturer 101 can use its inventory to make up for the deficiencies. While this solution solves some problems, it incurs the added cost of warehousing these excess tires at an OEM-controlled site.

Another problem with supply chain production is the lack of knowledge amongst the chain members. Typically, the OEM 101 does not know the inventory of lower members in the chain. The OEM 101 cannot increase production of a good if it does not know what its supply of parts will be in the near future. If an OEM 101 knows the inventories of its supplier SMEs 110–112 and 120–124, it can increase production, of automobiles in this example, and simply obtain appropriate inventories of brake pads, engines, and tires from SMEs 110–112. Similarly, if primary suppliers 110–113 know the inventories of secondary suppliers 120–124, they too can increase production and relieve the secondary suppliers 120–124 of their respective inventories. Thus, by having the knowledge of it's supply chain partners' business operations, OEM 101 can increase production knowing that its primary and secondary suppliers will provide for the increased demand in parts.

In order to obtain this business information about the SMEs, the OEMs have conventionally resorted to direct communication between themselves such as electronic data interchange (EDI). Simply put, an employee at an OEM calls an employee at an SME in a chain and asks for a status of the SME's inventory. This request can also take the form of a facsimile letter, a regular letter, an express letter, an e-mail message, or other forms of communication. In all order to obtain a response, the OEM employee will often interrupt the SME employee so that the SME employee can answer the question either verbally or via a written communication. If the SME is understaffed, the request for data may languish at the SME before it is answered. Thus, this method of obtaining information often requires time between when the OEM employee makes a request for information and when the SME employee is available to provide the requested information.

These inefficient methods of collecting SME information are compounded if the OEM is seeking information from a group of suppliers. Suppose OEM 101 accepts brake pads from both SMEs 110a and 110b. If OEM 101 desires to increase production of automobiles, an OEM employee will have to send a message to SME 110a and 110b. That employee will then have to sift through the responses and determine if one or both of SMEs 110a and 110b can provide the sought after brake pads.

Other conventional solutions to the "information problem" have been custom designed for only a few individuals in the chain. Some of these custom solutions utilize a private or semi-private network and require every participant to use the same (or interchangeable) custom or equivalent inventory software. Thus, suppliers who desire or are otherwise coerced by the OEM to take advantage of these custom solutions will incur the costs (potentially quite large costs to the SMEs) of buying custom software, and converting their current inventory and other data from the supplier's preferred formats to the format in the custom solution. Not only will the supplier incur these costs, but it will also be abandoning a system it prefers for the new custom system. This solution is expensive and labor intensive, and therefore may not be a desirable or practical option for the smaller suppliers who cannot afford to spend additional resources for custom software or workforce to do the conversion, and/or networks.

These problems exist, in part, because enterprise resource planning (ERP) software providers have focused on large organizations able to afford the six and seven figure installation, implementation, training, and maintenance costs long associated with their packages. Supply chain software providers have focused primarily on specialized software solutions complementing these ERP systems. SMEs have often been reluctant to invest in these large systems.

There is therefore a need for solutions, which integrate SMEs into business information networks without the large-scale solutions currently offered.

SUMMARY OF THE INVENTION

In preferred embodiments, the invention includes systems and methods for sharing business information. These embodiments establishing a plurality of user access profiles and establishing small-to-medium enterprise (SME) client processes operative upon user direction, in accordance with the access profiles, to perform at least one of: access SME supply chain data, translate SME supply chain data from a native format to a common format, and transmit common format SME supply chain data via the at least one communications network. These embodiments further include establishing, for each SME client process, a SME host process, operative upon user direction, for the corresponding SME and in accordance with the access profiles, to perform at least one of: receive the common format supply chain data, and respond to queries of received common format supply chain data.

DESCRIPTION OF THE SEVERAL VIEWS OF THE DRAWING(S)

Each drawing is exemplary of the characteristics and relationships described thereon in accordance with a preferred embodiment of the present invention.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. In preferred embodiments, system components are individually and collectively configured and interrelated as described herein.

Figure 1:
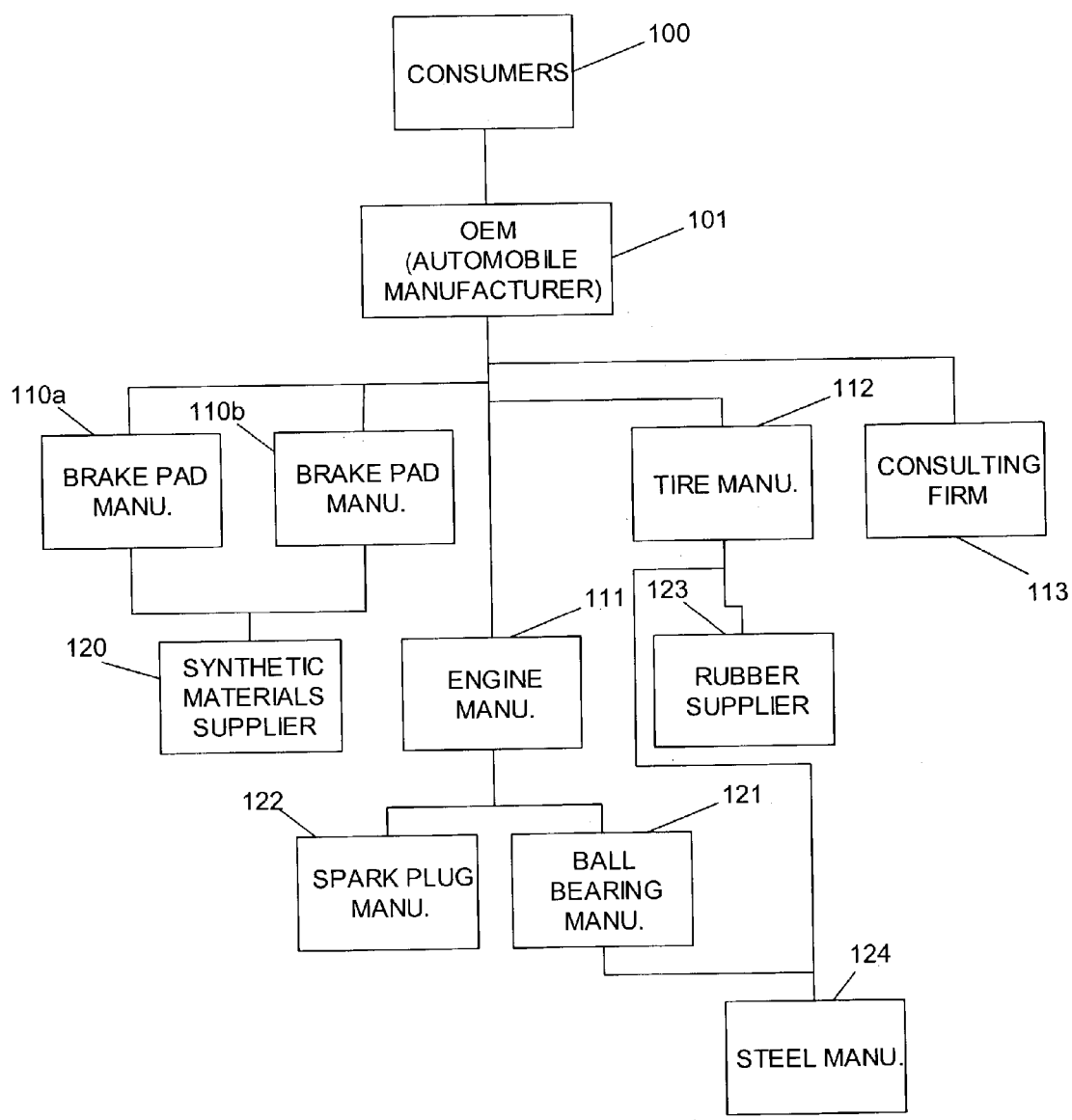
FIG. 1 illustrates supply chain relationships between various SMEs and an OEM.
Figure 2:
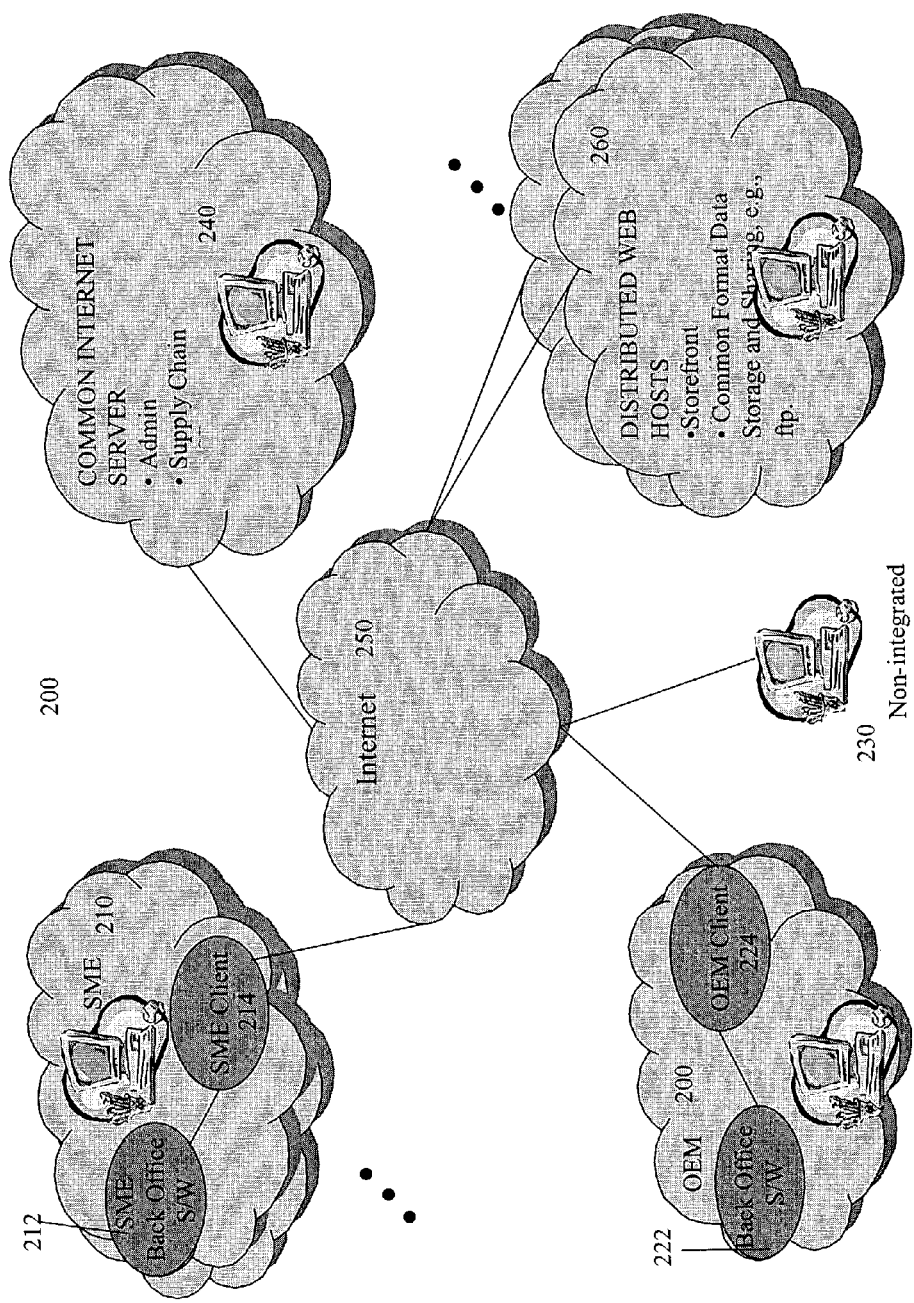
FIG. 2 illustrates an exemplary business information network of the present invention.

Referring to FIG. 2, a distributed architecture 200 for a business information network in accordance with preferred embodiments of the present invention is shown. In the illustrated embodiment, the network has both SME 210 and OEM 220 users—along with non-integrated users 230. Nonintegrated users 230 can access those features of preferred embodiments of the invention offered in hypertext transfer protocol (http://) pages through a typical browser program. Integrated SME 210 and OEM 220 users are more deeply coupled to the architecture 200 as described in exemplary embodiments herein. The term "OEM user" is illustrative, such users can be OEMs, other manufacturers, other SMEs, or anyone with integrated access to a system of the present invention acting as a customer (in the broadest sense) or supplier to a SME.

The typical SME 210 will have an off-the-shelf back office software application 212, e.g., QuickBooks®, Great Plains®, or inventory control software, for collecting and processing SME supply chain data. Such supply chain data can include on-hand quantities, lead time information, back order status, cost, etc. For illustrative purposes, the OEM 220 has an enterprise resource planning (ERP) system 222 containing types of data similar to the SME supply chain data and relevant to the OEM's operation.

In the architecture illustrated in FIG. 2, a server process 240 is shown in communication with a broader communications network 250. Note that "process" can be one or more software "processes," e.g., in the fashion, that "process" is used in a UNIX environment. In preferred embodiments, and in the figure, the Internet is used as the communications network 250. Other communications networks, e.g., an intranet, an extranet, or other telecommunications networks, can also fill this role. Among other functionality, the server process 240 registers new installations of application software, e.g., various processes, associated with the present invention. The server process 240 also establishes and maintains user accounts. Each user account includes an access profile for the corresponding user as part of the overall security approach of the invention.

An SME client process 214 is characteristic of preferred embodiments of the invention. At each SME, the client process(es) 214 is in communication with at least one SME supply chain data system 212 and the communications network 250. Any particular instance of a SME client process 214 can implement a range of functionality, including: access to SME supply chain data, translation of SME supply chain data from its native format to a common format, transmission of translated SME supply chain data via the communications network 250, computer-assisted creation of hypertext markup language (HTML) web page content, transmission of web page content via the communications network 250 (for example to distributed web hosts 240, as described later). In preferred embodiments, SME client processes 214 translate SME supply chain data to extensible markup language (XML) format. In combination with process(es) executing on a SME host 260, described herein below, the SME client process 214 provides e-mail functionality in preferred embodiments, preferably SMTP. In addition, SME client processes 214 can provide file transfer capability; preferably under file transfer protocol (FTP). The SME client process 214 serves as an interface to the range of services offered by the Server 240 and the SME host(s) 260. In a preferred embodiment, the SME client process 214 is co-located with it associated SME supply chain data.

Continuing to refer to FIG. 2, preferred embodiments of the invention include a SME host process 260 corresponding to each SME client process 214. Each SME host process 260 is in communication with the communications network 250. SME host process functionality includes the ability to receive translated SME supply chain data and to make this data responsive to query from users (specifically query from users whose access profile allows this function). As with SME client process 210, the SME host process 260 supports FTP file transfer. Web page content is received by the SME host process 260 and made available on the world wide web through the SME host process connection with the communications network 250.

In preferred embodiments, the Common Internet Server 240 process includes one or more application service provider (ASP) solutions. These solutions can include: currency conversion, on-line distance learning, virtual meeting place, community message boards, personnel file management, accounting, receivables tracking, inventory tracking, supply chain management, enterprise resource planning, as well as other known ASP solutions. Links to each of these services also can be provided through the web hosts 260.

Another portion of a network of the present invention includes an OEM client 224. An OEM client 224 acts as an interface between the OEM's supply chain software/data 222, e.g., an ERP system, and other network processes. Similar to the SME client 214, the OEM client 224 has access to OEM supply chain data and can translate such data into a common format, e.g., XML. The OEM client process 224 can transmit the translated data across the communications network 250 to its appropriate destination, e.g., for posting on a web host available to network users having the appropriate access privilege. The OEM client process(es) can also provide e-mail and file transfer functionality similar to those provided by the SME client 214.

Preferred embodiments of the invention include a secure communications approach employing encrypted communications channels and controlled access to network data and functions, for example including the use of firewalls and user authentication processes.

Figure 3:
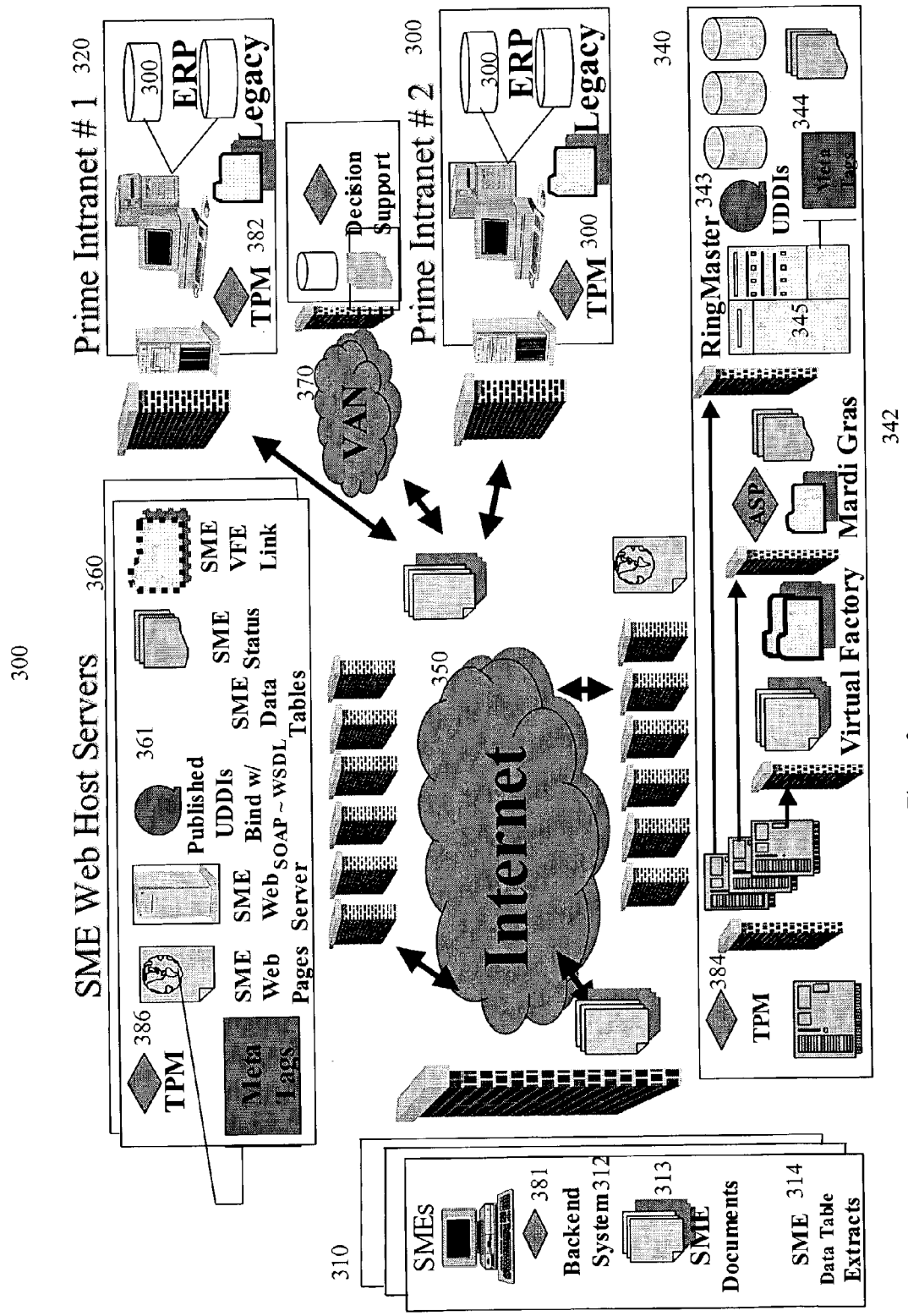
FIG. 3 illustrates an exemplary business information network of the present invention.

Referring to FIG. 3, another preferred embodiment of a distributed architecture 300 for a business information network of the present invention is shown. In this embodiment, the network has both SME users 310 and Prime users (e.g., large national manufacturer) 320, 330. User access to the system is coordinated by a common server 340 accessible via a communications network 350, e.g., the Internet, between the users and web host servers 360. In addition, the figure illustrates value added networks (VANs) 370 visible to the system 300 via the communications network 350. At the each of the SME 310, Prime 320, 330, common server 340, and web host 360, software of the present invention 380 includes a transaction processing manager and other specialized software 381–386.

System software 381 at a SME 310 includes an installer for loading and configuring software of the present invention on to a computer. A registration tool registers the copy of the system software 381 installed at the SME 310 computer with the common server process 340. Similar loading, configuring, and registration take place at other nodes where system software 380 is installed. The system software 381 also includes a web site configuration module that allows a SME user to select from a menu of web page configurations and supply user-specific data. The selected web page configuration and user-specific data are used to populate a web page at the web host server 360 corresponding to that user. System software 381 provides functionality to import document type definitions (DTD) and XML Schema Documents (XSDs) In addition, tools are provided for building a graphical user interface (GUI) for entering data into a document in accordance with a DTD/XSD, along with tools for associating a particular type of input data source, e.g., e-mail to orders@SME.com, with a particular DTD/XSD. The system software 381 allows a SME to import data from external sources, e.g., other SMEs, SME back-end systems 312, into XML-formatted documents and send/receive documents regardless of format. XML data can be exported by the system to the SME user's web host site 360 for access by the SME's customers and suppliers. The system software 381 generally operates to translate data from SME backend systems 312 to a format compatible with that sought by SME customers and suppliers and then send that translated data to a corresponding web host 360, a prime 320, 330, or the common server 340 as appropriate. For example, preferred embodiments of the invention can convert on-hand inventory data tracked in an Excel spreadsheet to XML-tagged data (e.g., 313, 314), comma delimited data, or any one of other well known data formats and post the data on a web host 360 visible to customers, e.g., visible via a common server 340. In preferred embodiments, revisions to data already send to web host server are executed as incremental updates.

Again referring to FIG. 3, system software 384 manages transactions between the common server 340 and other elements of the business information network. In one aspect, system software authenticates and verifies a user requesting a transaction. Password and authentication triggers a user profile which determines the preferred format for transactions. In another aspect, a process 343 provides universal description, discovery, and integration (UDDI) directory service that enables a user to publish, find, and bind to web services, e.g., those SME services such as ordering offered at the SME web host 360. In proffered embodiments, the common server 340 also includes processes for a virtual factory (VFAC). The VFAC acts as a store for technical drawings, production reports, quality assurance data, and technical manuals. The VFAC allows users to connect to and use programs that are on computers located at remote sites by (for example) launching X-Windows based and other applications remotely. The VFAC also allows a supplier to submit contractual data via the Internet thereby allowing a purchaser to evaluate the data.

In yet another aspect, encoded metatags 344 are employed to indicate data specific to a SME and to collect data to be used only anonymously in the aggregate as business intelligence. In a further aspect, the common server 340 includes processes 345 for registering users along with verifying and authenticating user sessions.

Web host servers 360 of the present invention are responsive to remotely invoked (e.g., simple object access protocol (SOAP) compliant) service requests, e.g., directed from a UDDI directory 343 maintained on the common server 340. These invocation requests can specify ports in accordance with web services definition language (WSDL) standards. Services available include ordering, order tracking, and query-based data requests.

In preferred embodiments of the present invention, a user seeking business information regarding a SME can obtain that information in any one of several formats from a web host server 360 established and maintained separately from the SME itself. Formats range from the ubiquitous browser page to XML to a wide variety of ERP-compatible schemas. This offers the advantage, among others, that the user (e.g., a prime manufacturer) is decoupled from what could be bottlenecks in communication, storage, or processing at the SME itself. The impediment of data in a format foreign to the requester is also overcome by providing data in a fromat amenable to efficient processing for a wide variety of users. In addition to changes in the way data is presented, e.g., comma-delimited vs. XML-tagged, SME data such as a part number can be mapped to corresponding vendor analogs. For example, an SME brake pad manufacturer may identify one brake pad model as M-255 in a back-office inventory system, e.g., 312, formatted as a comma delimited file, while a large auto manufacturer may identify the same brake pads BP101 in an ERP system 322 based on Access™. Preferred embodiments of the invention, concurrent with translating the SME's data in to a format compatible with the large auto manufacturer's ERP system, also map "M-255" to "BP101."

Using preferred embodiments of the current invention a prime manufacturer can connect to multiple suppliers by identifying the suppliers through the UDDI directory 343 which links the prime to a particular service (hosted on a web host 361) of a particular supplier; the serviced being invoked in a SOAP-compliant way with parameters in accordance with WSDL.

As a further example of use of preferred embodiments, a small shipper could use embodiments of the invention to submit import paperwork to Customs electronically; in some cases, e.g., under the Trade Partnership Against Terrorism, obtaining expedited processing. In addition, by linking to a user deposit account, the shipper can pay taxes, duties, and other fees. Monitoring agencies could then be permitted to track the shipments on-line via a VAN, e.g., FedEx, supplemented by actual invoice data, after being authorized through the central server 340.

As a further example of use of preferred embodiments, a small business enterprise can transmit business data and documents to a server in a "telecommunications network" such as a frame relay. Business communications demand high-speed transport and high-level security—and a data network that can rapidly change its size, location, and capabilities. Frame Relay Service gives an SME the high-speed performance and flexibility they need—while letting the network evolve seamlessly to technologies like Asynchronous Transfer Mode (ATM). At the core of the Frame Relay Service network is an ATM switching backbone that provides high-speed reliability, low congestion, and consistent performance. The SME can then use the data and document management similar to the use of "Voice Mail" storage from a Telecom provider. Preferred embodiments of the invention can then link this data to ERP and other decision support systems of customers and suppliers.

It should be recognized that various preferred embodiments and characteristics thereof, which have been described, are merely illustrative of the principles of this invention. Numerous modifications and adaptations thereof will be readily apparent to those skilled in the art without departing from the spirit and scope of the present invention. While manufacturing entities are used in the enabling embodiments disclosed above, other embodiments of the invention are useful in any are where business information is to be exchanged, e.g., legal, insurance, etc.

I claim:

1. A method for sharing business information in a network, the network having users, users comprising individuals from at least one small-to-medium enterprise (SME) having SME supply chain data, the method comprising:
   establishing a plurality of user access profiles visible over a communications network, one user access profile per user;
   establishing at least one SME client process, each SME client process:
      in communication with:
         at least one SME supply chain data system and
         the communications network; and
      operative upon user direction, in accordance with the access profiles, to perform at least one of:
         access SME supply chain data,
         translate SME supply chain data from a native format to a common format, and
         transmit common format SME supply chain data via the at least one communications network;
   establishing, for each SME client process, a SME host process, the SME host process:
      in communication with the communications network;
      operative upon user direction, for the corresponding SME and in accordance with the access profiles, to perform at least one of:
         receive the common format supply chain data, and
         respond to queries of received common format supply chain data.

2. The method of claim 1, wherein users further comprise individuals associated with at least one original equipment manufacturer (OEM), at least one OEM having OEM supply chain data, the method further comprising:
   establishing at least one OEM client process, each OEM client process:
      in communication with:
         at least one OEM supply chain data system and
         the at least one communications network; and
      operative, in accordance with the access profile, to perform at least one of:
         access OEM supply chain data,
         translate OEM supply chain data from a native format to a common format,
         transmit common format OEM supply chain data via the at least one communications network.

* * * * *